United States Patent
Ali et al.

(10) Patent No.: US 11,896,958 B1
(45) Date of Patent: Feb. 13, 2024

(54) ZIRCONIUM DOPED TERBIUM NANO OXIDES FOR WASTEWATER REMEDIATION

(71) Applicant: KING FAISAL UNIVERSITY, Al-Ahsa (SA)

(72) Inventors: Mai Mostafa Khalaf Ali, Al-Ahsa (SA); Hany Mohamed Abd El-Lateef Ahmed, Al-Ahsa (SA); Mohamed Salaheldeen, San Sebastian (ES); Ahmed M. Abu-Dief, Madinah (SA); Zeid M. Owidah, Madinah (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/233,058

(22) Filed: Aug. 11, 2023

(51) Int. Cl.
| | |
|---|---|
| *B01J 23/10* | (2006.01) |
| *B01J 21/06* | (2006.01) |
| *C09B 67/00* | (2006.01) |
| *B01J 37/04* | (2006.01) |
| *B01J 35/00* | (2006.01) |
| *B01J 37/08* | (2006.01) |

(52) U.S. Cl.
CPC ............. *B01J 23/10* (2013.01); *B01J 21/066* (2013.01); *B01J 35/004* (2013.01); *B01J 37/04* (2013.01); *B01J 37/08* (2013.01); *C09B 67/0001* (2013.01)

(58) Field of Classification Search
CPC ........ B01J 23/10; B01J 21/066; B01J 35/004; B01J 37/04; B01J 37/08; C09B 67/0001
See application file for complete search history.

(56) References Cited

PUBLICATIONS

Rahimi-Nasrabadi, M. et al., "Nanosized terbium carbonate and oxide particles: optimized synthesis, and application as photodegradation catalyst" Journal of Materials Science: Materials in Electronics 29: pp. 2988-2998 (2018).
Ramos-Guerra et al., "The role of the stabilizing agent on the structural and luminescent properties of hydrothermally synthesized ZrO2:Tb3+phosphors" Ceramics International, 44(12): pp. 13744-13749 2018.
Balabanov, S. S. et al., "Sinterability of nanopowders of terbia solid solutions with scandia, yttria, and lutetia" Journal of Advanced Ceramics 7(4): pp. 362-369 (2018).
Ye, Z. et al., "Preparation, Characterization and Application of Fluorescent Terbium Complex-Doped Zirconia Nanoparticles" Journal of Fluorescence 15: pp. 499-505 (2005).

*Primary Examiner* — James A Fiorito
(74) *Attorney, Agent, or Firm* — Nath, Goldberg & Meyer; Richard C. Litman

(57) ABSTRACT

Zirconium doped terbium nano oxides ($ZrTb_2O_3$). The nano oxides can have an average diameter ranging from about 17 nm to about 22 nm. The nano oxides can be used as a photocatalyst for photodegradation of organic dyes. In an embodiment, the organic dyes include textile wastewater dyes. In an embodiment, the textile wastewater dyes include methylene blue (MB) and/or Congo Red (CR). In an embodiment, the zirconium doped terbium nano oxides ($ZrTb_2O_3$) can be prepared by a dual co-precipitation and calcination method.

4 Claims, 3 Drawing Sheets

ZIRCONIUM DOPED TERBIUM NANO OXIDES FOR WASTEWATER REMEDIATION

BACKGROUND

Field

The disclosure of the present patent application relates to photocatalysts for photodegradation of organic dyes, and particularly to zirconium doped terbium nano oxides/nanoparticles ($ZrTb_2O_3$ NPs) for photodegradation of organic dyes.

Description of Related Art

Zirconia is a multifunctional material with potential applications in wide domains. Rare-earth doped zirconia and stabilized zirconia yield interesting properties based on the phase transitions induced by the sintering conditions.

$ZrO_2$ has various potentially desirable properties including a high melting point, phase stability, and low thermal expansion. The compound is also known to have a wide band gap of 4.97-5.90 eV. $ZrO_2$ possesses a unique set of characteristics like considerable mechanical strength, hardness, and thermal conductivity and can be easily doped with ions of rare earth elements. Catalysts used in photo-induced reactions are very attractive to be used in green procedures for photodegradation of toxic dyes. Such catalysts or photocatalysts convert light energy to chemical energy and are also known to be environment-friendly tools for various environmental issues.

Dyes are utilized in many industries such as textile, rubber, coating, paint, automobile industries, etc. A major source of dye pollution is caused by certain textile industries. In many countries in the Middle East, textile industries contribute significantly to economic growth. As these dyes are toxic, they must be separated and eliminated from effluents before the effluents are released into the environment.

Different dyes have different chemical and physical properties due to their chemical structure, origin, and application. Accordingly, some dyes must be handled differently from others. To eliminate the toxic effect of dyes there are many methods applied such as adsorption, oxidation, reduction, precipitation, and the like. During these processes of disposal, different toxic products can be separated and eliminated from effluents into the environment.

Nanoparticles have a large surface area which can be helpful for the removal of dye from wastewater. Due to their high surface area to volume ratio, nanoparticles can be combined more efficiently with dye molecules for degradation, increasing the number of dye molecules that can be degraded.

Thus, a photocatalyst solving the aforementioned problems is desired.

SUMMARY

Upon subjecting samples to UV or Vis light in the presence of photo-catalysts, different organic contaminants, e.g., organic dyes, can be decomposed. According to the present subject matter, doping of terbium nano oxides by zirconium, or doping zirconium nano oxides by terbium, is expected to increase the degradation efficiency of organic dyes compared with $ZrO_2$ or $Tb_2O_3$ when taken alone.

The present subject matter relates to zirconium doped terbium nano oxides and/or terbium doped zirconium nano oxides prepared by a dual co-precipitation and calcination method.

In an embodiment, the present subject matter relates to a method for making zirconium doped terbium nano oxides, the method comprising: dissolving terbium nitrate ($Tb(NO_3)_3.6H_2O$) and zirconium nitrate hydrate ($Zr(NO_3)_3.xH_2O$) in water to obtain a solution; adjusting pH of the solution to about 7.5 by dropwise addition of a solution of $NaHCO_3$; stirring to obtain a homogenous solution containing zirconium ($Zr(CO_3)_2.xH_2O$) and terbium ($Tb_2(CO_3)_3.xH_2O$) carbonate precipitates; centrifuging and drying the homogenous solution to obtain $Zr(CO_3)_2$ and $Tb_2(CO_3)_3$ metal carbonates; calcinating the $Zr(CO_3)_2$ and $Tb_2(CO_3)_3$ metal carbonates at a temperature of about 825° C. to about 875° C.; and obtaining the zirconium doped terbium nano oxides ($ZrTb_2O_3$).

In an embodiment, the resultant nanoparticles of the doped nano oxides can have an average diameter ranging from about 17 nm to about 22 nm. The nano oxides can be used as a photocatalyst for photodegradation of organic dyes. In an embodiment, the organic dyes include textile wastewater dyes. In an embodiment, the textile wastewater dyes include Congo red (CR) and/or methylene blue (MB).

In one embodiment, the present subject matter relates to a method for photodegradation of organic dyes including dispersing zirconium doped terbium nano oxides ($ZrTb_2O_3$) in a solution including the organic dyes to provide a mixture and irradiating the mixture with ultraviolet light.

In another embodiment, the present subject matter relates to a method for photodegradation of an organic dye, comprising: dispersing $ZrTb_2O$ nano oxides in an aqueous solution including the organic dye to provide a suspension, the $ZrTb_2O_3$ nano oxides having an average diameter ranging from about 17 nm to about 22 nm; and subjecting the suspension to light irradiation.

These and other features of the present subject matter will become readily apparent upon further review of the following specification.

DETAILED DESCRIPTION

Figure 1:
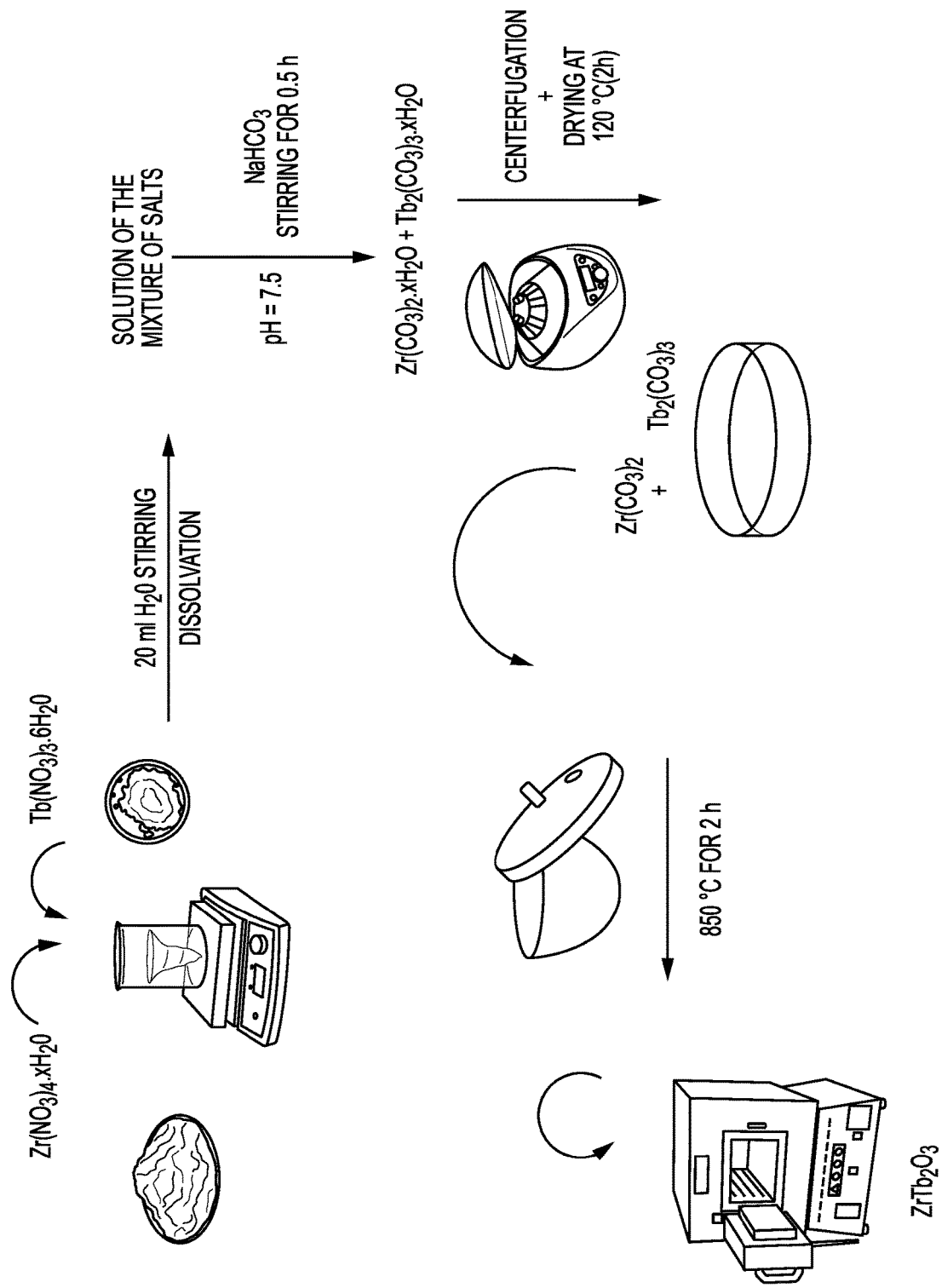
FIG. 1 is a reaction scheme for preparing the zirconium doped terbium nano oxides ($ZrTb_2O_3$).

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to zirconium doped terbium nano oxides and/or terbium doped zirconium nano oxides prepared by a dual co-precipitation and calcination method.

In an embodiment, the present subject matter relates to a method for making zirconium doped terbium nano oxides, the method comprising: dissolving terbium nitrate ($Tb(NO_3)_3 \cdot 6H_2O$) and zirconium nitrate hydrate ($Zr(NO_3)_3 \cdot xH_2O$) in water to obtain a solution; adjusting pH of the solution to about 7.5 by dropwise addition of a solution of $NaHCO_3$; stirring to obtain a homogenous solution containing zirconium ($Zr(CO_3)_2 \cdot xH_2O$) and terbium ($Tb_2(CO_3)_3 \cdot xH_2O$) carbonate precipitates; centrifuging and drying the homogenous solution to obtain $Zr(CO_3)_2$ and $Tb_2(CO_3)_3$ metal carbonates; calcinating the $Zr(CO_3)_2$ and $Tb_2(CO_3)_3$ metal carbonates at a temperature of about 825° C. to about 875° C.; and obtaining the zirconium doped terbium nano oxides ($ZrTb_2O_3$).

In an embodiment in this regard, a solution of $NaHCO_3$ can be added dropwise to the solution until the solution reaches a pH of about 7.5 before the homogenous solution containing the zirconium ($Zr(CO_3)_2 \cdot xH_2O$) and terbium ($Tb_2(CO_3)_3 \cdot xH_2O$) carbonate precipitates is obtained. Similarly, the calcinating can occur for at least about 2 hours at a temperature of about 850° C. Likewise, the drying can occur at about 120° C. for at least about 2 hours.

For example, the zirconium doped terbium nano oxides ($ZrTb_2O_3$) can be prepared by dissolving terbium nitrate ($Tb(NO_3)_3 \cdot 6H_2O$) and zirconium nitrate hydrate ($Zr(NO_3)_3 \cdot xH_2O$) in water to provide a mixture. A solution of $NaHCO_3$ can be added to the mixture dropwise until a pH of the mixture is about pH 7.5. The mixture can be centrifuged and dried to obtain $Zr(CO_3)_2$ and $Tb_2(CO_3)_3$ metal carbonates. The obtained metal carbonates can then calcinated. In an embodiment, the powders can be calcinated at a temperature ranging from about 825° C. to about 875° C., or at a temperature of about 850° C., for about 1 hour to about 3 hours, or for about 2 hours.

The present subject matter relates to zirconium doped terbium nano oxides, also referred to herein as nanoparticles (NPs), also referred to herein as zirconium doped terbium nano oxides ($ZrTb_2O_3$), as made according to the present methods. In an embodiment, the zirconium doped terbium nano oxides can have an average diameter ranging from about 17 nm to about 22 nm. The nano oxides can be used as a photocatalyst for photodegradation of organic dyes. In an embodiment, the organic dyes include textile wastewater dyes. In an embodiment, the textile wastewater dyes include methylene blue (MB) and/or Congo red (CR). The present nano oxides can provide a more efficient photodegradation of the organic dyes than zirconium oxide, or terbium oxide, alone, or than any other oxides mixed with zirconium oxide. In this regard, the present nano oxides can provide an about 98% photodegradation, or degradation, of the methylene blue and/or an about 99.5% photodegradation, or degradation, of the Congo red. This increased photodegradation may, in part, be a result of increased surface area of the zirconium doped terbium nano oxides ($ZrTb_2O_3$) nanoparticles compared with, for example, $ZrO_2$ nanoparticles.

The nanocomposite can include $ZrO_2$ which has a high melting point and phase stability and low thermal expansion. $ZrO_2$ is also known to have a wide band gap of 4.97-5.90 eV. $ZrO_2$ possesses a unique set of characteristics like considerable mechanical strength, hardness, and thermal conductivity. $ZrO_2$ can be easily doped with ions of rare earth elements.

According to an embodiment, a method for photodegradation of organic dyes can include dispersing zirconium doped terbium nano oxides ($ZrTb_2O_3$) in an aqueous solution including the organic dyes to provide a suspension and irradiating the suspension with light. In an embodiment, a concentration of the organic dye in the solution is about 10 mg/L. Other concentrations of the organic dye in the solution are further contemplated herein including, by way of non-limiting example, about 5 to about 15 mg/L, about 5 mg/L, about 10 mg/L, or about 15 mg/L. In an embodiment, about 15 mg to about 25 mg of the zirconium doped terbium nano oxides ($ZrTb_2O_3$), about 15 mg, about 16 mg, about 17 mg, about 18 mg, about 19 mg, about 20 mg, about 21 mg, about 22 mg, about 23 mg, about 24 mg, about 25 mg, or about 20 mg of the nano oxides can be dissolved in about 70 ml to about 80 mL of the solution, or in about 75 mL of the solution.

In an embodiment, the mixture can be subjected to light irradiation selected from ultraviolet (UV) radiation and visible light (Vis) radiation. In an embodiment, the emission wavelength of the light irradiation can be about 254 nm. In an embodiment, the mixture is stirred to achieve an adsorption-desorption equilibrium prior to irradiating the mixture. In an embodiment, the mixture can be magnetically stirred prior to irradiation. In an embodiment, the mixture can be magnetically stirred for a period of time ranging from about one hour. In a further embodiment, the mixture can be stirred under dark conditions.

The present teachings are illustrated by the following examples.

EXAMPLES

Synthetic Examples

Example 1

Synthesis of Zirconium-Doped Terbium Nano Oxides

Zirconium doped Terbium nano oxides were prepared via a combination of co-precipitation and calcination methods according to the reaction scheme shown in FIG. 1.

Zirconium doped Terbium nano oxides were prepared by dissolving stoichiometric molar amounts of Terbium nitrate $Tb(NO_3)_3 \cdot 6H_2O$ (for Tb1-Tb3 (0.05-0.15 mmole) and zirconium nitrate hydrate $Zr(NO_3)_3 \cdot xH_2O$ in 20 mL of deionized water. The mixture was stirred magnetically until the starting material metal salts were completely dissolved in deionized water. After that, the pH of the solution was adopted to 7.5 by adding a solution of $NaHCO_3$ (2 M) drop-by-drop. After 0.5 h under continuous stirring, a homogeneous solution containing carbonate precipitates of the metal salts was obtained. The obtained products were centrifuged, washed several times with de-ionized water, acetone, and absolute ethanol, and then dried at 120° C. for 2 h. The obtained solid was subjected to calcination at 850° C. for 2 h to obtain the desired products.

Example 2

Figure 2A:
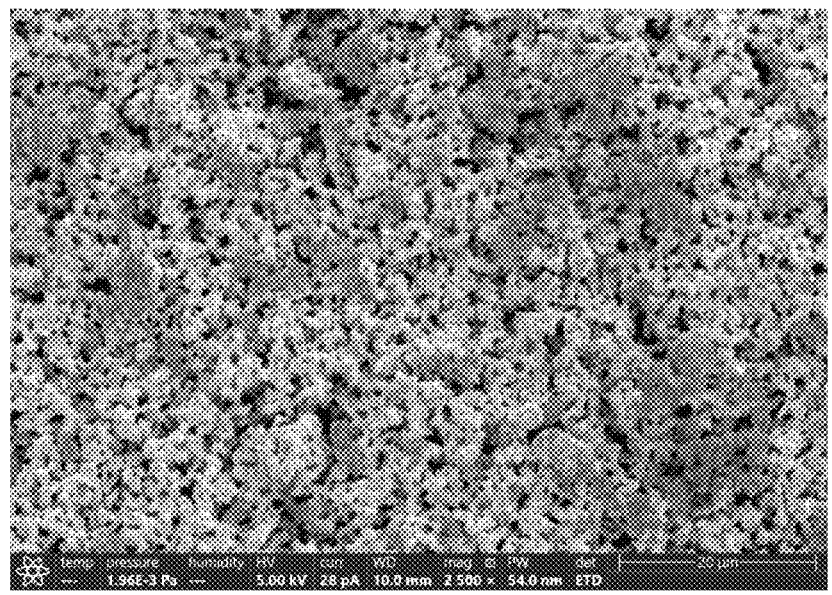
FIG. 2A is a Scanning Electron Microscopy image (SEM) of $ZrO_2$ nanoparticles.
Figure 2B:
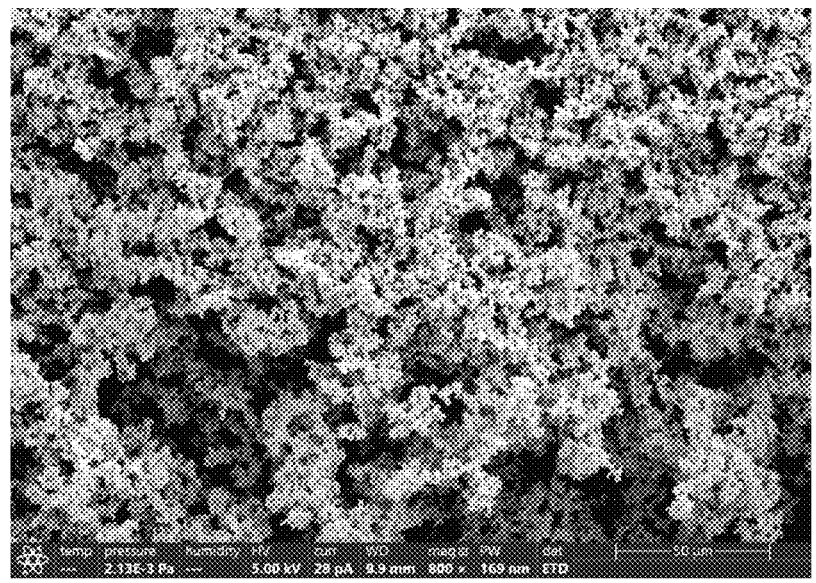
FIG. 2B is a Scanning Electron Microscopy image (SEM) of the zirconium doped terbium nano oxides ($ZrTb_2O_3$) nanoparticles.
Figure 3:
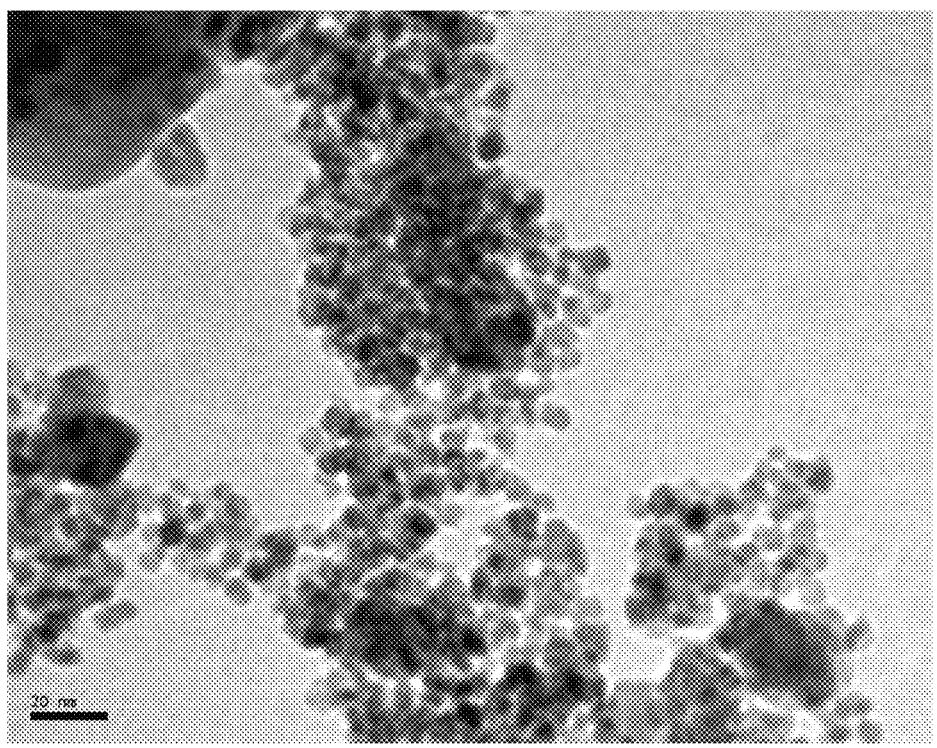
FIG. 3 is a Transmission Electron Microscopy image (TEM) of the zirconium doped terbium nano oxides ($ZrTb_2O_3$) nanoparticles.

Characterization of the Prepared Zirconium Doped Terbium Nano Oxides Using SEM The surface morphology of pure $ZrO_2$ nanoparticles and zirconium-doped terbium nano oxides were examined by scanning electron microscopy (SEM) as illustrated in FIGS. 2A-2B. SEM analysis verified the pure $ZrO_2$ nanoparticle sample had a spherical shape with good separation of particles. TEM analysis shows that the prepared zirconium doped terbium nano oxides lie within the range of 17-22 nm as shown in FIG. 3.

Example 3

Photocatalytic Activity Test

The photocatalytic activities of the as-synthesized samples were investigated by the photo-degradation of Congo red (CR) or methylene blue (MB) dyes as a pollutant model under ultraviolet (UV) irradiation (30 Watt, 280 nm-100 nm UV-C Germicidal lamp with main emission wavelength 254 nm). The degradation efficiency depends on illumination time and was evaluated by using a double-beam UV-VIS-NIR spectrophotometer. In a typical experiment, 20 mg of the photocatalyst was dispersed in 75 ml MB aqueous solution at a concentration of 10 mg/L to produce a suspension for the degradation reaction. Prior to illumination, the obtained solution was magnetically stirred in the dark for 60 min to attain adsorption-desorption equilibrium. All experiments were performed under the same experimental conditions (at room temperature, constant magnetic stirring, and natural pH). During the UV irradiation and at regular intervals, about 4 ml of suspension was sampled by syringe and subsequently centrifuged at a rate of 4000 rpm to remove the photocatalyst powder from the MB solution. In order to follow the degradation of the MB, the absorption spectra and then the concentration of MB in the UV-Vis region was monitored by Jasco, V-570 UV-Vis-NIR Spectrophotometer.

The degradation efficiency for $ZrTb_2O_3$ nanoparticles (NPs) compared with $ZrO_2$ NPs show enhancement in the activity from 85% in the case of $ZrO_2$ to 99.5% and 98% in the case of $ZrTb_2O_3$ NPs for Congo red and methylene blue dyes, respectively. This could be ascribed to the increase of the surface area of $ZrTb_2O_3$ NPs compared with $ZrO_2$ NPs.

It is to be understood that the $ZrTb_2O_3$ nanoparticles are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method for making zirconium doped terbium nano oxides, the method comprising:
    dissolving terbium nitrate ($Tb(NO_3)_3 \cdot 6H_2O$) and zirconium nitrate hydrate ($Zr(NO_3)_3 \cdot xH_2O$) in water to obtain a solution;
    adjusting pH of the solution to about 7.5 by dropwise addition of a solution of $NaHCO_3$;
    stirring to obtain a homogenous solution containing zirconium ($Zr(CO_3)_2 \cdot xH_2O$) and terbium ($Tb_2(CO_3)_3 \cdot xH_2O$) carbonate precipitates;
    centrifuging and drying the homogenous solution to obtain $Zr(CO_3)_2$ and $Tb_2(CO_3)_3$ metal carbonates;
    calcinating the $Zr(CO_3)_2$ and $Tb_2(CO_3)_3$ metal carbonates at a temperature of about 825° C. to about 875° C.; and
    obtaining the zirconium doped terbium nano oxides ($ZrTb_2O_3$).

2. The method of claim 1, wherein a solution of $NaHCO_3$ is added dropwise to the solution until the solution reaches a pH of about 7.5 before the homogenous solution containing the zirconium ($Zr(CO_3)_2 \cdot xH_2O$) and terbium ($Tb_2(CO_3)_3 \cdot xH_2O$) carbonate precipitates is obtained.

3. The method of claim 1, wherein the calcinating occurs for at least about 2 hours at a temperature of about 850° C.

4. The method of claim 1, wherein the drying occurs at about 120° C. for at least about 2 hours.

\* \* \* \* \*